(12) United States Patent  
Alshukr

(10) Patent No.: US 12,468,049 B2
(45) Date of Patent: Nov. 11, 2025

(54) COMPUTED RADIOGRAPHY IMAGING PLATE WITH IMBEDDED NFC TAG

(71) Applicant: SAUDI ARABIAN OIL COMPANY, Dhahran (SA)

(72) Inventor: Hasan Alshukr, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 237 days.

(21) Appl. No.: 18/192,853

(22) Filed: Mar. 30, 2023

(65) Prior Publication Data

US 2024/0329260 A1 Oct. 3, 2024

(51) Int. Cl.
*G01T 1/16* (2006.01)
*H04B 5/77* (2024.01)

(52) U.S. Cl.
CPC ............. *G01T 1/1606* (2013.01); *H04B 5/77* (2024.01)

(58) Field of Classification Search
CPC ........ G01T 1/1606; G01T 1/2012; H04B 5/77
See application file for complete search history.

(56) References Cited

U.S. PATENT DOCUMENTS

| | | | | |
|---|---|---|---|---|
| 4,316,817 A * | 2/1982 | Cusano | .................... | G21K 4/00 |
| | | | | 252/301.36 |
| 4,374,749 A * | 2/1983 | Cusano | ................. | G01T 1/2002 |
| | | | | 252/301.36 |
| 4,375,423 A * | 3/1983 | Cusano | .................. | G01T 1/2002 |
| | | | | 252/301.36 |
| 5,659,592 A * | 8/1997 | Robertson | ............ | G03B 42/047 |
| | | | | 378/185 |
| 9,152,832 B2 * | 10/2015 | Royston | .................... | H04B 5/45 |
| 10,816,890 B2 * | 10/2020 | Weber | .................... | A61B 6/512 |
| 11,228,344 B2 * | 1/2022 | Rozman | .................. | H04B 5/45 |
| 2003/0123613 A1 * | 7/2003 | Evans | .................... | G01N 23/04 |
| | | | | 378/146 |
| 2013/0084801 A1 * | 4/2013 | Royston | ................... | H04B 5/73 |
| | | | | 455/41.1 |
| 2015/0324680 A1 * | 11/2015 | Berger | ................. | A61B 6/4216 |
| | | | | 235/375 |
| 2016/0084969 A1 * | 3/2016 | Sato | ........................ | G01T 1/241 |
| | | | | 250/370.08 |
| 2016/0182127 A1 * | 6/2016 | Karandikar | .............. | H04B 5/48 |
| | | | | 455/41.1 |
| 2018/0199898 A1 * | 7/2018 | Zhang | .................... | G01N 23/04 |
| 2019/0149196 A1 * | 5/2019 | Hueber | ................ | H03B 5/1203 |
| | | | | 340/10.1 |
| 2019/0325176 A1 * | 10/2019 | Tsai | .................... | G06K 7/10128 |
| 2021/0049333 A1 * | 2/2021 | Tsai | .................... | G06K 7/10316 |
| 2022/0253614 A1 * | 8/2022 | Tsai | .................... | G06K 7/10316 |

\* cited by examiner

*Primary Examiner* — David P Porta
*Assistant Examiner* — Gisselle M Gutierrez
(74) *Attorney, Agent, or Firm* — Osha Bergman Watanabe & Burton LLP

(57) ABSTRACT

Systems and methods are disclosed. The methods include imbedding a Near Field Communication (NFC) tag in an imaging plate (IP), equipping a scanner with an NFC reader, scanning the IP with the NFC reader, updating information on the NFC tag with the NFC reader, and determining if a lifecycle threshold of the IP has been exceeded. The methods further include retiring the IP from when the lifecycle threshold of the IP is exceeded.

11 Claims, 3 Drawing Sheets

COMPUTED RADIOGRAPHY IMAGING PLATE WITH IMBEDDED NFC TAG

BACKGROUND

Computed Radiographic Testing (RT) technology uses an imaging plate (IP) to radiograph an inspected opaque body. The IP is scanned to extract the radiograph and convert it to a digital image. IPs are rated for a maximum number of times after which the quality of the image begins to deteriorate. Currently, there is no implemented method to track the imaging count of IPs automatically.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments are disclosed related to methods. The methods include imbedding a Near Field Communication (NFC) tag in an imaging plate (IP), equipping a scanner with an NFC reader, scanning the IP with the NFC reader, updating information on the NFC tag with the NFC reader, determining if a lifecycle threshold of the IP has been exceeded, and retiring the IP from when the lifecycle threshold of the IP is exceeded.

In general, in one aspect, embodiments are disclosed related to a system, including an IP, an NFC tag, configured to be imbedded in the imaging plate, and a scanner, configured to read an image from the IP, wherein the scanner is equipped with an NFC reader, and wherein the NFC reader is configured to scan the NFC tag on the IP and update stored information related to a lifecycle of the IP.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
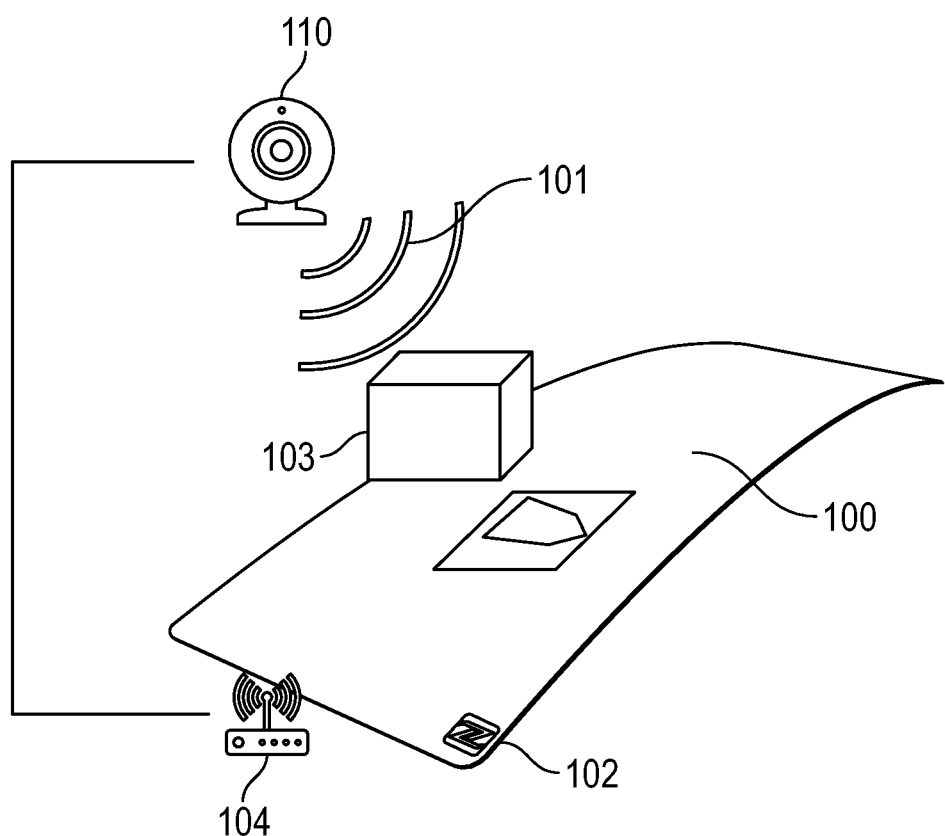
FIG. 1A shows a scanner recording an image on an imaging plate (IP) with an imbedded NFC tag, according to one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-2, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a seismic dataset" includes reference to one or more of such seismic datasets.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein are directed to the imbedding of a Near Field Communication (NFC) tag onto an imaging plate (IP), and equipping a scanner with an NFC reader. Each time the IP is scanned, the NFC reader modifies information or metadata on the NFC tag. More specifically, in one or more embodiments, the metadata is a counter tracking the lifecycle of the IP. Because IPs are rated for a certain number of times after which the quality of the image begins to deteriorate, the NFC tag may store a counter that is increased by one each time the IP is scanned. The NFC tag stores the most updated/final count for the purpose of tracking the life cycle of the IP. However, other, more complex information could be stored on the NFC tag, such as, e.g., the physical state of the IP, the IP manufacturer, the IP's first date of use, the joint welder symbol, the joint number, and the join welding procedure specification (WPS)

number. This list, however, does not exhaust the possible applications that a person of ordinary skill in the art could implement with the invention. The information storing mechanism on the NFC tag is independent of the scanner and no online connection is required to keep the registry. The NFC tag may be placed, for example, on a corner of the IP so it does not interfere with the area of interest of the radiograph.

Figure 1B:
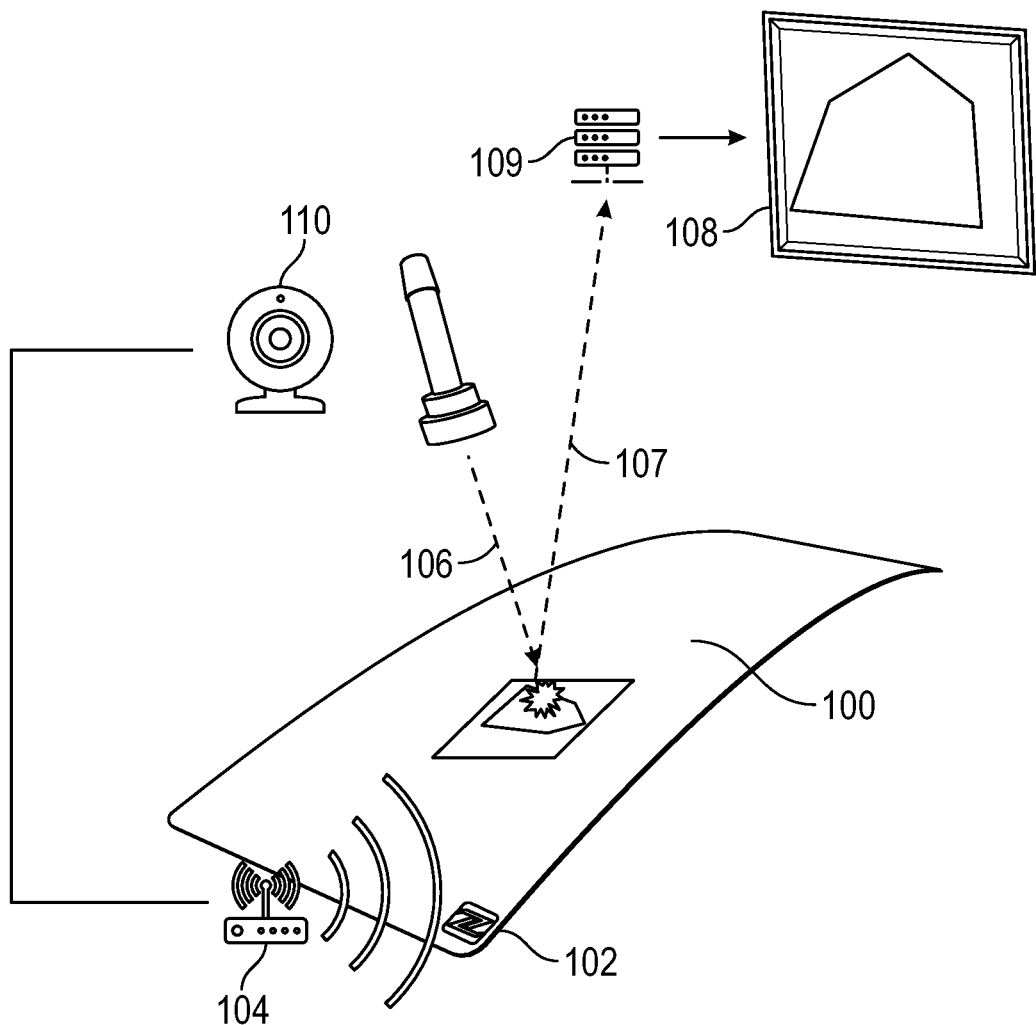
FIG. 1B shows an image being read from an imaging plate and an NFC tag being modified, according to one or more embodiments.

An IP as used in computed Radiographic Testing (RT) may be viewed as an improved digital version of conventional analog X-ray film, and is used in the same applications (e.g., medical imaging). As illustrated in FIGS. 1A and 1B, a common way of performing computed RT involves transmitting electromagnetic radiation (usually X-ray or gamma ray radiation) with a scanner (110) through an opaque body (103) onto an IP (100). Transmitted energy is lost where the radiation is most impeded by the body. This results in contrasting amounts of radiation impinging upon different locations of the IP (100). These contrasts may then be used to construct an image.

The IP (100) shown in FIGS. 1A and 1B may be based on photostimulated luminescence and may be a photostimulable phosphor plate. The photostimulable phosphor plate shown may be a few micrometers in thickness and is stimulable by the short wavelength electromagnetic radiation. The use of a photostimulable phosphor plate does not limit the invention. Any IP (100) capable of receiving and storing an image using any energy source would also be feasible with the same method and systems described here.

As shown in FIGS. 1A and 1B, the use of an IP (100) involves radiating the IP with electromagnetic radiation twice. In FIG. 1A, the first radiation (101) writes an image onto the IP (100) in a phosphor layer on the IP (100). Extra electrons from the radiation are stored in a metastable state by ionizing a chemical substrate and then becoming trapped in a crystal lattice in a conduction band. In FIG. 1B, the second radiation (106) reads the image, usually with a laser beam. When stimulated by the laser beam, the IP (100) may emit light at a prescribed frequency and with an intensity that is proportional to the amount of radiation received during the exposure. The emitted light (107) is subsequently detected by a photomultiplier (109) and converted into a digital two-dimensional image (108). The digital image may then be viewed on a computer monitor.

After an IP (100) is read, it may be erased with a high-intensity white light source and used again multiple times. For industrial applications, an IP (100) will suffer mechanical damage, like scratches and abrasions, over time. Moreover, "radiation fatigue" will occur, where the IP's (100) ability to record images is degraded. Due to these effects, IPs (100) are rated for use a certain number of times (typically, hundreds to thousands of times), after which the quality of the image begins to deteriorate. At that point, the IP (100) must be retired from use.

An imbedded NFC tag (102) is shown on the IP (100) in FIGS. 1A and 1B. The NFC tag (102) offers a mechanism for monitoring the amount of use of the IP (100). In FIG. 1B, either before or after extracting an image from the IP (100), an NFC reader (104) may transmit a signal to the NFC tag (102). This causes stored information (e.g., metadata) on the NFC tag (102) to be modified, such as, e.g., a counter being incremented by one.

NFC readers (104) communicate with NFC tags (102) over a short distance (usually less than 5 cm, but sometimes more) through a group of established point-to-point communication protocols. Through this mechanism, NFC tags (102) may be both read and written to by the NFC reader (104). Physically, the NFC tag (102) consists of a chip where data and code is stored, and an antenna for communication. The near-field communication of the NFC tag (102) functions by the inductive coupling of its antenna with that of an NFC reader (104). The NFC tag (102) does not have a power source. Rather, it draws power through the induced current caused by the NFC reader (104).

Figure 2:
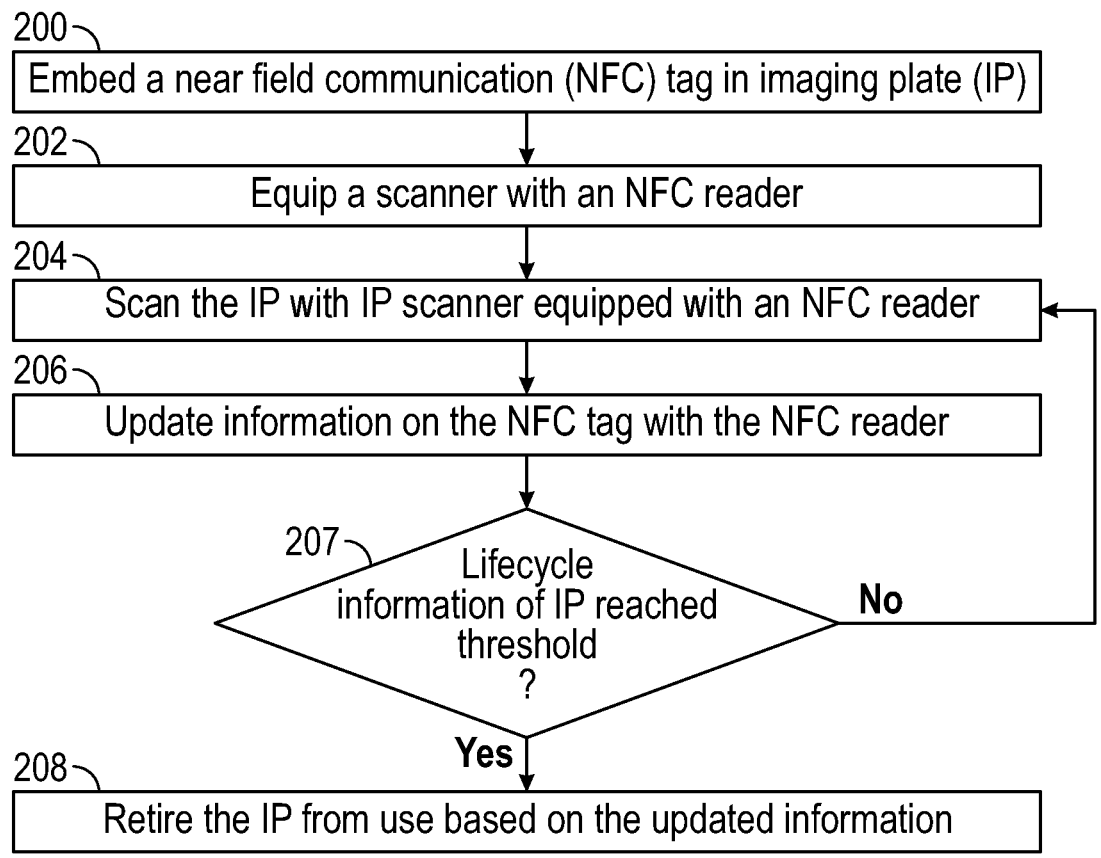
FIG. 2 shows a flowchart for a method of monitoring lifecycle information of an IP according to one or more embodiments.

FIG. 2 is a flowchart of a method for determining lifecycle information of an IP (100) with an imbedded NFC tag (102) used for computed radiography. In Step 200, an NFC tag (102) is imbedded in an IP (100). An NFC tag (102) may be embedded on the IP (100) with an adhesive. In alternate embodiments, because an NFC tag (102) consists of an antenna and a chip, it may also be built directly into the IP (100). The NFC tag (102) may be embedded at any location of the IP (100). However, a corner of the IP may be an optimal location, as it will minimally obscure the image of the opaque body (103).

In Step 202, a scanner (110) is equipped with an NFC reader (104). The NFC reader (104) may be a part of the scanner and integrated into its electronic circuits. Alternatively, it may be sold separately as an upgrade to existing systems with suitable mounting mechanism and data connection interface.

Due to distance limitations, the NFC reader (104) must be placed in close proximity to the NFC tag (102) in order to communicate with it. The NFC reader (104) may be any device that is capable of transmitting signals according to the NFC communication protocols (i.e., an appropriate radio transmitter).

In Step 204, the scanner (110) equipped with the NFC reader (104) scans the IP (100). Moving the NFC reader (104) near the NFC tag (102) causes magnetic induction of the antenna on the NFC tag (102), thereby supplying power to its chip so that short wave radio signals may be sent back and forth between it and the NFC reader (104).

In Step 206, the chip on the NFC tag (102) updates information regarding its physical state and lifecycle.

In Step 207, the lifecycle information obtained from the NFC tag (102) is checked to see if it exceeds a threshold limit. If that threshold is exceeded, the flowchart continues to Step 208, and the IP (100) is retired from service. If the threshold is not exceeded, the flowchart returns to Step 204.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
    imbedding a Near Field Communication (NFC) tag in an imaging plate (IP);
    equipping a scanner with an NFC reader;
    scanning the IP with the NFC reader;
    updating information on the NFC tag with the NFC reader;
    wherein the information on the NFC tag comprises a counter, a joint welder symbol and a joint number,
    determining if a lifecycle threshold of the IP has been exceeded; and
    retiring the IP from when the lifecycle threshold of the IP is exceeded.

2. The method of claim 1, wherein the counter on the NFC tag is incremented by one when scanned by the NFC reader.

3. The method of claim 1, wherein the NFC tag is imbedded on a corner of the IP.

4. A system, comprising:
- an imaging plate (IP);
- an Near Field Communication (NFC) tag, configured to be imbedded in the imaging plate; and
- a scanner, configured to read an image from the IP,
- wherein the scanner is equipped with an NFC reader,
- wherein the NFC reader is configured to scan the NFC tag on the IP and update stored information related to a lifecycle of the IP, and
- wherein the information on the NFC tag comprises a counter, a joint welder symbol and a joint number.

5. The system of claim 4, wherein the counter on the NFC tag is incremented by one when scanned by the NFC reader.

6. The system of claim 4, wherein the NFC tag is imbedded on a corner of the IP.

7. The system of claim 4, wherein the NFC reader tracks a number of uses of the NFC tag.

8. The system of claim 4, wherein the scanner emits electromagnetic radiation.

9. The system of claim 8, wherein the electromagnetic radiation is one of the following: x-rays and gamma rays.

10. The system of claim 4, wherein the IP is erased after each use.

11. The system of claim 10, wherein the IP is erased with a high-intensity light source.

* * * * *